United States Patent
He et al.

(10) Patent No.: US 12,499,868 B2
(45) Date of Patent: Dec. 16, 2025

(54) DATA PROCESSING METHOD

(71) Applicant: BEIJING BAIDU NETCOM SCIENCE TECHNOLOGY CO., LTD., Beijing (CN)

(72) Inventors: Jing He, Beijing (CN); Jianping Qi, Beijing (CN); Zhuqing Zhou, Beijing (CN); Huibin Zhao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 279 days.

(21) Appl. No.: 18/296,914

(22) Filed: Apr. 6, 2023

(65) Prior Publication Data

US 2023/0245643 A1    Aug. 3, 2023

(30) Foreign Application Priority Data

Apr. 8, 2022  (CN) .......................... 202210369968.6

(51) Int. Cl.
| | |
|---|---|
| *G10L 13/02* | (2013.01) |
| *G06F 40/216* | (2020.01) |
| *G06F 40/30* | (2020.01) |
| *G10L 15/02* | (2006.01) |
| *G10L 15/25* | (2013.01) |

(52) U.S. Cl.
CPC ............ *G10L 13/02* (2013.01); *G06F 40/216* (2020.01); *G06F 40/30* (2020.01); *G10L 15/02* (2013.01); *G10L 15/25* (2013.01)

(58) Field of Classification Search
CPC .......... G06T 13/40; G06F 40/30; G06F 3/011; G06F 2203/011; G06F 40/253; G10L 13/02; G10L 13/027; G10L 15/02; G10L 15/22; G10L 15/25; G10L 15/1815
See application file for complete search history.

(56) References Cited

U.S. PATENT DOCUMENTS

| | | | |
|---|---|---|---|
| 10,923,102 B2 * | 2/2021 | Wang ................ | G10L 15/1815 |
| 12,406,316 B2 * | 9/2025 | Natarajan ............ | G06F 16/285 |
| 2021/0201549 A1 * | 7/2021 | Bendale ................ | G06T 13/40 |
| 2021/0397644 A1 | 12/2021 | DeLuca et al. | |
| 2022/0051654 A1 * | 2/2022 | Finkelstein ............ | G06N 3/088 |
| 2022/0269724 A1 * | 8/2022 | Gao ...................... | G06F 16/685 |
| 2022/0351266 A1 * | 11/2022 | Ren .................. | G06Q 10/06395 |
| 2023/0316643 A1 * | 10/2023 | Chai ................... | G06V 40/171 |
| | | | 345/419 |

FOREIGN PATENT DOCUMENTS

| | | |
|---|---|---|
| CN | 104123938 A | 10/2014 |
| CN | 110265021 A | 9/2019 |
| CN | 110868635 A | 3/2020 |
| CN | 110941954 A | 3/2020 |
| CN | 113259778 A | 8/2021 |
| CN | 113822967 A | 12/2021 |

* cited by examiner

*Primary Examiner* — Richemond Dorvil
(74) *Attorney, Agent, or Firm* — Seed IP Law Group LLP (57) ABSTRACT

A data processing method is provided. The method includes: obtaining a speech pattern data of a target user based on a speech information of the target user, where the speech pattern data indicates a speech feature of the target user; and converting a broadcast text into an audio content based on the speech pattern data, where a text of the audio content corresponds to the broadcast text, and the audio content has the speech feature.

18 Claims, 3 Drawing Sheets

DATA PROCESSING METHOD

CROSS REFERENCE TO RELATED APPLICATION

This application claims priority to Chinese patent application No. 202210369968.6 filed on Apr. 8, 2022, the contents of which are hereby incorporated by reference in their entirety for all purposes.

TECHNICAL FIELD

The present disclosure relates to the technical field of artificial intelligence, and specifically, to the technical fields of deep learning, natural language processing, and computer vision, and specifically relates to a data processing method and apparatus, an electronic device, a computer-readable storage medium, and a computer program product.

BACKGROUND

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies.

Data processing technologies based on artificial intelligence have been applied to various fields. In speech recognition based on artificial intelligence, a speech of a user is analyzed to feed back content related to the speech of the user to the user, so that the user may perform speech-based search.

Techniques described in this section are not necessarily techniques that have been previously conceived or employed. It should not be assumed that any one of the techniques described in this section is considered to be the prior art just because the technique is included in this section, unless otherwise indicated expressly. Similarly, a problem mentioned in this section should not be considered to be universally recognized in any prior art, unless otherwise indicated expressly.

SUMMARY

The present disclosure provides a data processing method and apparatus, an electronic device, a computer-readable storage medium, and a computer program product.

According to an aspect of the present disclosure, a data processing method is provided, including: obtaining a speech pattern data of a target user based on a speech information of the target user, wherein the speech pattern data indicates a speech feature of the target user; and converting a broadcast text into an audio content based on the speech pattern data, wherein a text of the audio content corresponds to the broadcast text, and the audio content has the speech feature.

According to an aspect of the present disclosure, an electronic device is provided, including: one or more processors; and a memory storing one or more programs configured to be executed by the one or more processors, the one or more programs comprising instructions for performing operations comprising: obtaining a speech pattern data of a target user based on a speech information of the target user, wherein the speech pattern data indicates a speech feature of the target user; and converting a broadcast text into an audio content based on the speech pattern data, wherein a text of the audio content corresponds to the broadcast text, and the audio content has the speech feature.

According to an aspect of the present disclosure, a non-transitory computer-readable storage medium is provided, storing one or more programs comprising instructions that, when executed by one or more processors of a computing device, cause the computing device to perform operations comprising: obtaining a speech pattern data of a target user based on a speech information of the target user, wherein the speech pattern data indicates a speech feature of the target user; and converting a broadcast text into an audio content based on the speech pattern data, wherein a text of the audio content corresponds to the broadcast text, and the audio content has the speech feature.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTIONS OF THE DRAWINGS

The accompanying drawings exemplarily show embodiments and form a part of the specification, and are used to explain example implementations of the embodiments together with a written description of the specification. The embodiments shown are merely for illustrative purposes and do not limit the scope of the claims. Throughout the accompanying drawings, the same reference numerals denote similar but not necessarily same elements.

DETAILED DESCRIPTION OF THE EMBODIMENTS

Embodiments of the present disclosure are described below in conjunction with the accompanying drawings, where various details of the embodiments of the present disclosure are included to facilitate understanding, and should only be considered as example. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one component from another. In some examples, a first element and a second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any one of and all possible combinations of listed items.

The embodiments of the present disclosure will be described below in detail with reference to the accompanying drawings.

Figure 1:
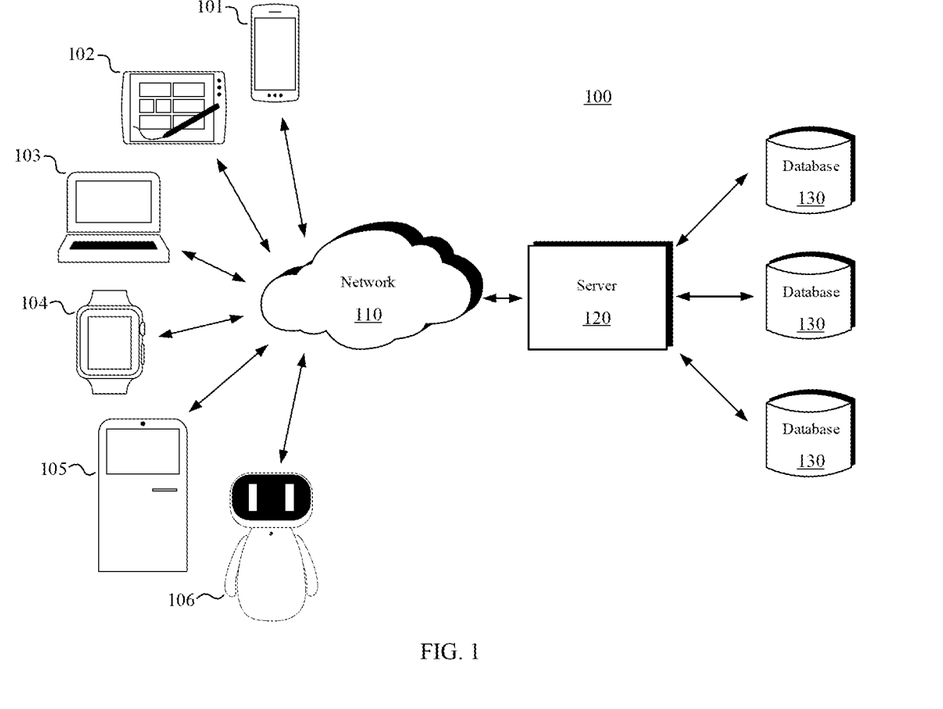
FIG. 1 is a schematic diagram of an example system in which various methods described herein can be implemented according to an embodiment of the present disclosure.

FIG. 1 is a schematic diagram of an example system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communications networks 110 that couple the one or more client devices to the server 120. The client devices 101, 102, 103, 104, 105, and 106 may be configured to execute one or more application programs.

In an embodiment of the present disclosure, the server 120 can run one or more services or software applications that enable a data processing method to be performed.

In some embodiments, the server 120 may further provide other services or software applications that may include a non-virtual environment and a virtual environment. In some embodiments, these services may be provided as web-based services or cloud services, for example, provided to a user of the client device 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client device 101, 102, 103, 104, 105, and/or 106 may sequentially use one or more client application programs to interact with the server 120, to use the services provided by these components. It should be understood that various different system configurations are possible, and may be different from that of the system 100. Therefore, FIG. 1 is an example of the system for implementing various methods described herein, and is not intended to be limiting.

A user may use the client device 101, 102, 103, 104, 105, and/or 106 to receive a first classification result. The client device may provide an interface that enables the user of the client device to interact with the client device. The client device may also output information to the user via the interface. Although FIG. 1 shows only six client devices, those skilled in the art will understand that any number of client devices is supported in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a smart screen device, a self-service terminal device, a service robot, a gaming system, a thin client, various messaging devices, and a sensor or other sensing devices. These computer devices can run various types and versions of software application programs and operating systems, such as MICROSOFT Windows, APPLE iOS, a UNIX-like operating system, and a Linux or Linux-like operating system (e.g., GOOGLE Chrome OS); or include various mobile operating systems, such as MICROSOFT Windows Mobile OS, iOS, Windows Phone, and Android. The portable handheld device may include a cellular phone, a smartphone, a tablet computer, a personal digital assistant (PDA), etc. The wearable device may include a head-mounted display (such as smart glasses) and other devices. The gaming system may include various handheld gaming devices, Internet-enabled gaming devices, etc. The client device can execute various different application programs, such as various Internet-related application programs, communication application programs (e.g., email application programs), and short message service (SMS) application programs, and can use various communication protocols.

The network 110 may be any type of network well known to those skilled in the art, and may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or WiFi), and/or any combination of these and/or other networks.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures related to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any one of the above operating systems and any commercially available server operating system. The server 120 can also run any one of various additional server application programs and/or middle-tier application programs, including an HTTP server, an FTP server, a CGI server, a JAVA server, a database server, etc.

In some implementations, the server 120 may include one or more application programs to analyze and merge data feeds and/or event updates received from users of the client devices 101, 102, 103, 104, 105, and 106. The server 120 may further include one or more application programs to display the data feeds and/or real-time events via one or more display devices of the client devices 101, 102, 103, 104, 105, and 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be configured to store information such as an audio file and an object file. The databases 130 may reside in various locations. For example, a data repository used by the server 120 may be locally in the server 120, or may be remote from the server 120 and may communicate with the server 120 via a network-based or dedicated connection. The databases 130 may be of different types. In some embodiments, the data repository used by the server 120 may be a database, such as a relational database. One or more of these databases can store, update, and retrieve data from or to the database, in response to a command.

In some embodiments, one or more of the databases 130 may also be used by an application program to store application program data. The database used by the application program may be of different types, for example, may be a key-value repository, an object repository, or a regular repository backed by a file system.

The system 100 of FIG. 1 may be configured and operated in various manners, such that the various methods and apparatuses described according to the present disclosure can be applied.

Figure 2:
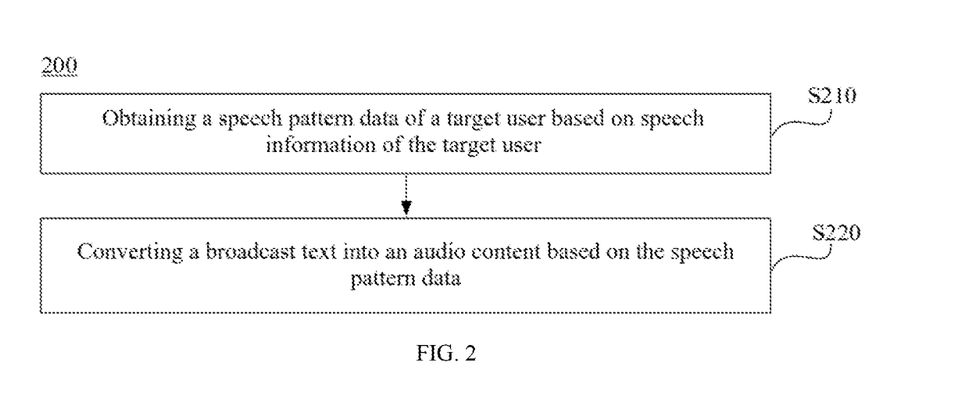
FIG. 2 is a flowchart of a data processing method according to an embodiment of the present disclosure.

Referring to FIG. 2, a data processing method 200 according to some embodiments of the present disclosure includes:

Step S210: Obtain speech pattern data of a target user based on speech information of the target user, where the speech pattern data indicates a speech feature of the target user.

Step S220: Convert a broadcast text into audio content based on the speech pattern data, wherein a text of the audio content corresponds to the broadcast text, and the audio content has the speech feature.

The speech pattern data of the target user is obtained based on the speech information of the user, and the broadcast text is converted into the audio with the speech feature of the target user based on the speech pattern data, so that the audio content output in response to the speech information of the user is audio that simulates the speech feature of the user. In this way, the user builds a sense of intimacy, love, and trust with the object that delivers the audio content. When a digital human performs speech broadcast, the user can build a sense of intimacy, love, and trust with the digital human, so that the user is emotionally closer to the digital human, the digital human can better persuade the user, and the user communicates with the digital human more harmoniously.

In some scenarios, broadcast may be performed based on preset audio content by analyzing speech information of a user. For example, when a user needs to order food, a digital human service system installed on a restaurant table receives and analyzes a speech of the user, and when obtaining through analysis that the speech of the user includes information corresponding to "order", triggers a digital human to broadcast pre-recorded audio content, for example, "what kind of food do you want to order? Our restaurant now provides spinach and egg soup", so that the user orders food after receiving the audio content. In this way, the user is served based on the speech of the user. However, the recorded audio content is the same for different users. As a result, a user only obtains corresponding information when receiving the audio, and emotional closeness to the user cannot be built.

According to the embodiments of the present disclosure, the speech pattern data of the target user is obtained by analyzing the speech information of the target user, and the broadcast text is converted into the audio content with the speech feature of the target user based on the speech pattern data. For example, when the target user comes from Sichuan province and orders food in a restaurant, pronunciation data in the speech pattern data of the target user is obtained by analyzing the speech information of the target user, where the pronunciation data indicates that a pronunciation feature of the target user is Sichuan accent, and the broadcast text is converted into the audio content with Sichuan accent based on the pronunciation data. In this way, since the audio content has Sichuan accent, when receiving the audio content, the target user builds a sense of intimacy, love, and trust with the object (for example, an ordering robot) that delivers or broadcasts the audio content.

In the technical solutions of the present disclosure, collection, storage, use, processing, transmission, provision, disclosure, etc. of user personal information involved all comply with related laws and regulations and are not against the public order and good morals.

In some embodiments, the method of the present disclosure is performed by a device including a processor, and the target user is a person performing speech interaction with the device.

In some embodiments, the data processing method according to the present disclosure further includes: obtaining the speech information of the target user. For example, speech audio of the target user is captured through a microphone, to obtain the speech information of the target user.

In some embodiments, the speech feature includes at least one of a pronunciation feature, a speech rate feature, a lexical feature, and a grammatical feature, and the speech pattern data includes at least one of the following: pronunciation data indicating a pronunciation feature of the target user; speech rate data indicating a speech rate feature of the target user; lexical data indicating a lexical feature of the target user; and grammatical data indicating a grammatical feature of the target user.

In some embodiments, the pronunciation data may be a tag indicating the pronunciation feature of the user, for example, Sichuan accent, Northeast accent, or Taiwan accent.

In some embodiments, the speech rate data may be a numerical value representing a speech rate of the user, for example, 60 words/min.

In some embodiments, the lexical data may be a modal particle commonly used by the user, for example, "ya", "ah", or "ne".

In some embodiments, the grammatical feature may be a tag representing a grammar commonly used by the user, for example, "inversion grammar".

In some embodiments, the obtaining speech pattern data of a target user based on speech information of the target user includes: analyzing the speech audio corresponding to the speech information, to obtain the pronunciation data. For example, the speech audio of the target user is input into a trained neural network to obtain the pronunciation data.

In some embodiments, the obtaining speech pattern data of a target user based on speech information of the target user includes: performing speech recognition on the speech information of the target user to obtain a speech text; and obtaining the speech rate data, the lexical data, and the grammatical data based on the speech text.

In some embodiments, the number of words per unit time is obtained based on a time and the speech text of the speech audio, to obtain the speech rate data; A modal particle commonly used by the user is obtained by obtaining the modal particle from the speech text, to obtain the lexical data. The grammatical feature of the user is obtained by analyzing a grammar in the speech text, to obtain the grammatical data.

In some embodiments, the data processing method according to the present disclosure further includes: performing speech recognition on the speech information of the target user to obtain a speech text; and obtaining the broadcast text based on the speech text.

In some embodiments, the obtaining the broadcast text based on the speech text includes: extracting a keyword from the speech text; and obtaining, from a broadcast text set based on the keyword, the broadcast text corresponding to the keyword.

In some embodiments, the converting a broadcast text into audio content based on the speech pattern data includes: synthesizing the broadcast text and the speech pattern data into the broadcast speech through a speech synthesis technology. For example, after the lexical data is added to the broadcast text, the broadcast speech is synthesized based on the pronunciation data.

Figure 3:
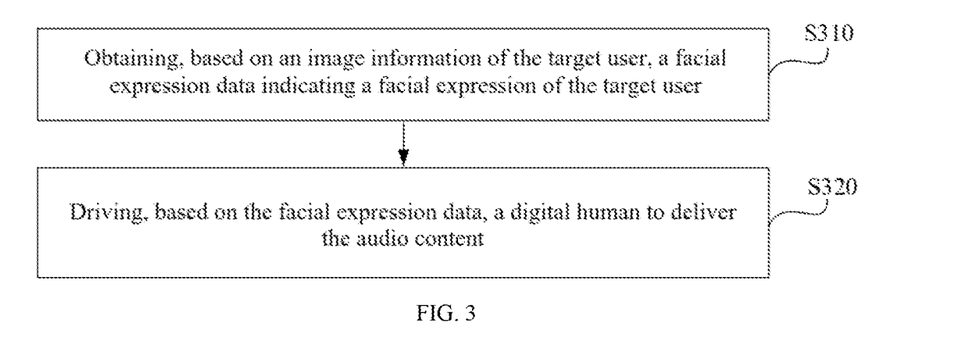
FIG. 3 is a flowchart of a data processing method according to an embodiment of the present disclosure.

In some embodiments, as shown in FIG. 3, the method of the present disclosure further includes:

Step S310: Obtain, based on an image information of the target user, a facial expression data indicating a facial expression of the target user, wherein the image information corresponds to the speech information.

Step S320: Drive, at least based on the facial expression data, a digital human to deliver the audio content, where the digital human has a broadcast expression when delivering the audio content, and wherein the broadcast expression corresponds to the facial expression of the target user.

In some embodiments, a digital human may be an intelligent assistant with a virtual image that provides services by interacting with users. A digital human may be an avatar displayed on a mobile phone, tablet computer, smart TV, intelligent voice assistant with a screen, or an offline large screen. In addition to obtaining the speech audio similar to a language feature of the user based on the speech audio, the facial expression data of the target user is also obtained based on the image information that is of the target user and that corresponds to the speech. When delivering the audio content, the digital human is driven to display the facial expression corresponding to the facial expression of the target user. In this way, while receiving the audio content similar to the speech feature of the target user, the target user can also watch the digital human corresponding to the facial expression of the target user. This better enables the user to build a sense of intimacy, love, and trust with the object that delivers the audio content, so that the user is emotionally closer to the digital human, the digital human can better persuade the user, and the user communicates with the digital human more harmoniously.

In some embodiments, video data of the target user is captured by a camera apparatus, to obtain the image information that is of the target user and that corresponds to the speech information.

In some embodiments, after face detection is performed on a plurality of image frames in the video data to obtain face key points, the facial expression data of the target user is obtained based on the face key points.

In some embodiments, 72 key points of the face are obtained through face detection, and the facial expression data of the target user is obtained by analyzing positions of the 72 key points.

In some embodiments, the facial expression data may be expression type data indicating an expression type and expression intensity data indicating an expression intensity.

The expression of the target user is evaluated from the two dimensions of type and intensity of the facial expression of the target user, so that the facial expression of the user represented by the obtained facial expression data is accurate, and the facial expression displayed by the digital human in a delivering process is more accurate.

In some embodiments, the expression type data may be an expression type tag, for example, "laughing", "confused", or "depressed". The expression intensity data may be an expression intensity tag corresponding to the expression type tag. For example, corresponding to "smile", there may be intensity tags such as "great" and "slight", so that it may be evaluated whether smile of the user is slight smile or laugh according to the facial expression data.

In some embodiments, driving weights of key points on the face of the digital human are obtained based on the facial expression data, and based on the driving weights, the digital human is driven to display a corresponding expression.

In some embodiments, the method in the embodiments of the present disclosure further includes: obtaining behavior data of the target user based on the image information, where the behavior data indicates a behavior of the target user; and the driving, based on the facial expression data, a digital human to deliver the audio content includes:

driving, based on the facial expression data and the behavior data, the digital human to deliver, communicate or broadcast the audio content, where the digital human has the broadcast expression and a broadcast behavior when delivering the audio content, and the broadcast behavior corresponds to the behavior of the target user.

In addition to obtaining the facial expression data of the target user, the behavior data indicating the behavior of the target user is also obtained, so that when delivering the broadcast speech, the digital human has the behavior corresponding to the target user, thereby further increasing the similarity between the digital human and the user.

In some embodiments, the behavior of the target user includes at least one of a motion, a posture, a gesture, and a breathing rate, and the behavior data further includes at least one of the following: motion data indicating a motion of the target user; posture data indicating a posture of the target user; gesture data indicating a gesture of the target user; and breathing rate data indicating a breathing rate of the target user.

The behavior of the user is analyzed based on the motion, the gesture, the posture, and the breathing rate, so that the obtained behavior data of the user can more accurately represent the behavior of the user, and the behavior displayed by the digital human in the delivering process is more accurate.

In some embodiments, the behavior data is obtained by analyzing position changes of key points of joints of the target user in the image information. For example, the behavior data is obtained by obtaining position changes of key points such as the hands, the elbow, and the abdomen.

In some embodiments, driving weights are generated based on the behavior data by establishing inverse kinematics (IK). Based on the driving weights, the digital human is driven to display a corresponding behavior.

Figure 4:
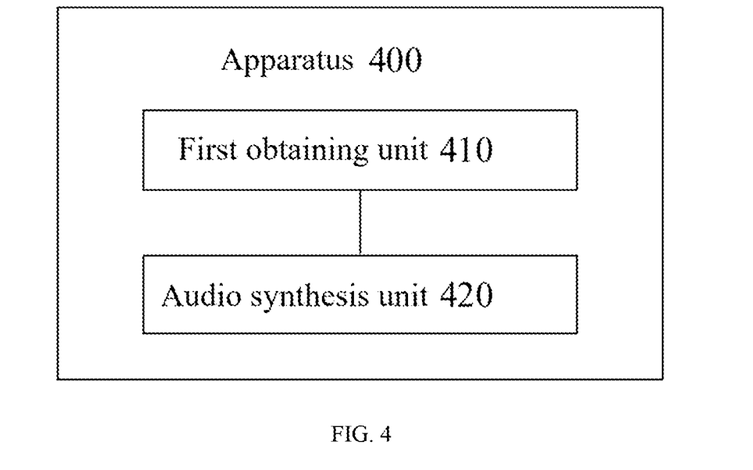
FIG. 4 is a structural block diagram of a data processing apparatus according to an embodiment of the present disclosure.

According to an aspect of the present disclosure, a data processing apparatus is further provided. As shown in FIG. 4, the apparatus 400 includes: a first obtaining unit 410, configured to obtain speech pattern data of a target user based on speech information of the target user, where the speech pattern data indicates a speech feature of the target user; and an audio synthesis unit 420, configured to convert a broadcast text into audio content based on the speech pattern data, wherein a text of the audio content corresponds to the broadcast text, and the audio content has the speech feature.

In some embodiments, the speech feature includes at least one of a pronunciation feature, a speech rate feature, a lexical feature, and a grammatical feature, and the speech pattern data includes at least one of the following: pronunciation data indicating a pronunciation feature of the target user; speech rate data indicating a speech rate feature of the target user; lexical data indicating a lexical feature of the target user; and grammatical data indicating a grammatical feature of the target user.

In some embodiments, the apparatus further includes: a third obtaining unit, configured to obtain, based on an image information of the target user, a facial expression data indicating a facial expression of the target user, wherein the image information corresponds to the speech information; and a driving unit, configured to drive, based on the facial expression data, a digital human to deliver the audio content, where the digital human has a broadcast expression when delivering the audio content, and the broadcast expression corresponds to the facial expression of the target user.

In some embodiments, the facial expression data includes expression type data and expression intensity data.

In some embodiments, the apparatus 400 further includes: a fourth obtaining unit, configured to obtain behavior data of the target user based on the image information, where the behavior data indicates a behavior of the target user; and the driving unit includes: a driving subunit, configured to drive, based on the facial expression data and the behavior data, the digital human to deliver the audio content, where the digital human has the broadcast expression and a broadcast behavior when delivering the audio content, and the broadcast behavior corresponds to the behavior of the target user.

In some embodiments, the behavior of the target user includes at least one of a motion, a posture, a gesture, and a breathing rate, and the behavior data further includes at least one of the following: motion data indicating a motion of the target user; posture data indicating a posture of the target user; gesture data indicating a gesture of the target user; and breathing rate data indicating a breathing rate of the target user.

According to an aspect of the present disclosure, an electronic device is further provided, including: at least one processor; and a memory communicatively connected to the at least one processor, where the memory stores instructions executable by the at least one processor, and when executed by the at least one processor, the instructions cause the at least one processor to perform the method according to the embodiments of the present disclosure.

According to an aspect of the present disclosure, a non-transitory computer-readable storage medium storing computer instructions is further provided, where the computer instructions are used to cause a computer to perform the method according to the embodiments of the present disclosure.

According to an aspect of the present disclosure, a computer program product is provided, including a computer program, where when the computer program is executed by a processor, the method according to the embodiments of the present disclosure is implemented.

Figure 5:
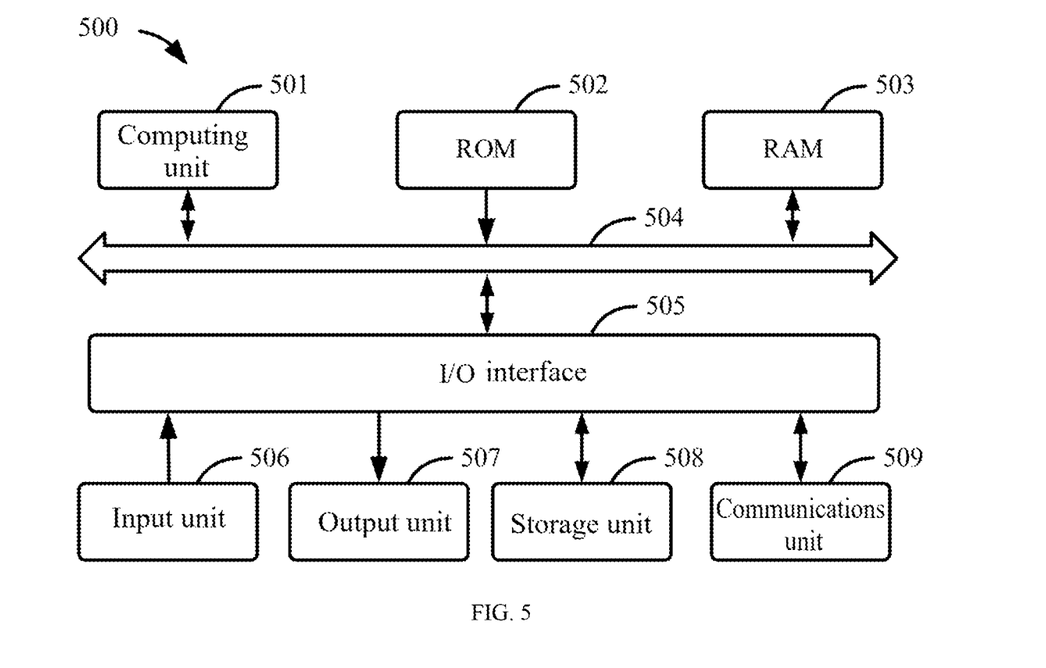
FIG. 5 is a structural block diagram of an example electronic device that can be configured to implement an embodiment of the present disclosure.

Referring to FIG. 5, a structural block diagram of an electronic device 500 that may serve as a server or a client of the present disclosure is now described. The electronic device is an example of a hardware device that may be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 5, the electronic device 500 includes a computing unit 501. The computing unit may perform various appropriate actions and processing according to a computer program stored in a read-only memory (ROM) 502 or a computer program loaded from a storage unit 508 to a random access memory (RAM) 503. The RAM 503 may further store various programs and data required for the operation of the electronic device 500. The computing unit 501, the ROM 502, and the RAM 503 are connected to each other through a bus 504. An input/output (I/O) interface 505 is also connected to the bus 504.

A plurality of components in the electronic device 500 is connected to the I/O interface 505. The components include: an input unit 506, an output unit 507, the storage unit 508, and a communications unit 509. The input unit 506 may be any type of device capable of entering information to the electronic device 500. The input unit 506 may receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 507 may be any type of device capable of presenting information, and may include, but is not limited to, a display, a speaker, an object/audio output terminal, a vibrator, and/or a printer. The storage unit 508 may include, but is not limited to, a magnetic disk and an optical disc. The communications unit 509 allows the electronic device 500 to exchange information/data with other devices via a computer network such as the Internet and/or various telecommunications networks, and may include, but is not limited to, a modem, a network interface card, an infrared communications device, a wireless communications transceiver, and/or a chipset, for example, a Bluetooth™ device, an 802.11 device, a WiFi device, a WiMax device, or a cellular communications device.

The computing unit 501 may be various general-purpose and/or special-purpose processing components with processing and computing capabilities. Some examples of the computing unit 501 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 501 performs the various methods and processing described above, for example, the method 200. For example, in some embodiments, the method 200 may be implemented as a computer software program, which is tangibly contained in a machine-readable medium, such as the storage unit 508. In some embodiments, a part or all of the computer program may be loaded and/or installed onto the electronic device 500 via the ROM 502 and/or the communications unit 509. When the computer program is loaded onto the RAM 503 and executed by the computing unit 501, one or more steps of the method 200 described above may be performed. Alternatively, in other embodiments, the computing unit 501 may be configured in any other suitable manner (for example, by means of firmware), to perform the method 200.

Various implementations of the systems and technologies described herein above may be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that may receive data and instructions from a storage system, at least one input apparatus, and at least one output apparatus, and transmit data and instructions to the storage system, the at least one input apparatus, and the at least one output apparatus.

Program codes used to implement the method of the present disclosure may be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein may be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user may provide an input to the computer. Other types of apparatuses may also be used to provide interaction with the user; for example, feedback provided to the user may be any form of sensory feedback (for example, visual feedback, auditory feedback, or tactile feedback), and an input from the user may be received in any form (including an acoustic input, a speech input, or a tactile input).

The systems and technologies described herein may be implemented in a computing system (for example, as a data server) including a backend component, or a computing system (for example, an application server) including a middleware component, or a computing system (for example, a user computer with a graphical user interface or a web browser through which the user may interact with the implementation of the systems and technologies described herein) including a frontend component, or a computing system including any combination of the backend component, the middleware component, or the frontend component. The components of the system may be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure may be achieved, which is not limited herein.

Although the embodiments or examples of the present disclosure have been described with reference to the accompanying drawings, it should be appreciated that the method, system, and device described above are merely example embodiments or examples, and the scope of the present invention is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A data processing method, comprising:
 obtaining a speech pattern data of a target user based on speech information of the target user, wherein the speech pattern data indicates a speech feature of the target user, wherein the speech feature comprises a lexical feature and a grammatical feature, wherein the speech pattern data comprises a lexical data indicating the lexical feature of the target user, and a grammatical data indicating the grammatical feature of the target user, and wherein the obtaining the speech pattern data of the target user based on the speech information of the target user comprises:

performing a speech recognition on the speech information of the target user to obtain a speech text;
obtaining a modal particle commonly used by the target user from the speech text to determine the modal particle as the lexical data; and
obtaining, by analyzing a grammar in the speech text, a tag representing a grammar commonly used by the target user to determine the tag as the grammatical data; and
converting a broadcast text into an audio content for delivery to the target user based on the speech pattern data, wherein a text of the audio content corresponds to the broadcast text, and the audio content has the speech feature.

2. The method according to claim 1, wherein the speech feature further comprises at least one of a pronunciation feature and a speech rate feature, and wherein the speech pattern data further comprises at least one of following:
a pronunciation data indicating the pronunciation feature of the target user; and
a speech rate data indicating the speech rate feature of the target user.

3. The method according to claim 1, further comprising:
obtaining, based on an image information of the target user, a facial expression data indicating a facial expression of the target user, wherein the image information corresponds to the speech information; and
driving, based on the facial expression data, a digital human to deliver the audio content, wherein the digital human has a broadcast expression when delivering the audio content, and wherein the broadcast expression corresponds to the facial expression of the target user.

4. The method according to claim 3, wherein the facial expression data comprises an expression type data and an expression intensity data.

5. The method according to claim 3, further comprising:
obtaining a behavior data of the target user based on the image information, wherein the behavior data indicates a behavior of the target user; and
wherein the driving, based on the facial expression data, the digital human to deliver the audio content comprises:
driving, based on the facial expression data and the behavior data, the digital human to deliver the audio content, wherein the digital human has the broadcast expression and a broadcast behavior when delivering the audio content, and wherein the broadcast behavior corresponds to the behavior of the target user.

6. The method according to claim 5, wherein the behavior of the target user comprises at least one of a motion, a posture, a gesture, and a breathing rate, and the behavior data further comprises at least one of following:
a motion data indicating the motion of the target user;
a posture data indicating the posture of the target user;
a gesture data indicating the gesture of the target user; and
a breathing rate data indicating the breathing rate of the target user.

7. An electronic device, comprising:
one or more processors; and
a memory storing one or more programs configured to be executed by the one or more processors, the one or more programs comprising instructions for performing operations comprising:
obtaining a speech pattern data of a target user based on speech information of the target user, wherein the speech pattern data indicates a speech feature of the target user, wherein the speech feature comprises a lexical feature and a grammatical feature, wherein the speech pattern data comprises a lexical data indicating the lexical feature of the target user, and a grammatical data indicating the grammatical feature of the target user, and wherein the obtaining the speech pattern data of the target user based on the speech information of the target user comprises:
performing a speech recognition on the speech information of the target user to obtain a speech text;
obtaining a modal particle commonly used by the target user from the speech text to determine the modal particle as the lexical data; and
obtaining, by analyzing a grammar in the speech text, a tag representing a grammar commonly used by the target user to determine the tag as the grammatical data; and
converting a broadcast text into an audio content for delivery to the target user based on the speech pattern data, wherein a text of the audio content corresponds to the broadcast text, and the audio content has the speech feature.

8. The electronic device according to claim 7, wherein the speech feature further comprises at least one of a pronunciation feature and a speech rate feature, and wherein the speech pattern data further comprises at least one of following:
a pronunciation data indicating the pronunciation feature of the target user; and
a speech rate data indicating the speech rate feature of the target user.

9. The electronic device according to claim 7, wherein the operations further comprising:
obtaining, based on an image information of the target user, a facial expression data indicating a facial expression of the target user, wherein the image information corresponds to the speech information; and
driving, based on the facial expression data, a digital human to deliver the audio content, wherein the digital human has a broadcast expression when delivering the audio content, and wherein the broadcast expression corresponds to the facial expression of the target user.

10. The electronic device according to claim 9, wherein the facial expression data comprises an expression type data and an expression intensity data.

11. The electronic device according to claim 9, wherein the operations further comprising:
obtaining a behavior data of the target user based on the image information, wherein the behavior data indicates a behavior of the target user; and
wherein the driving, based on the facial expression data, the digital human to deliver the audio content comprises:
driving, based on the facial expression data and the behavior data, the digital human to deliver the audio content, wherein the digital human has the broadcast expression and a broadcast behavior when delivering the audio content, and wherein the broadcast behavior corresponds to the behavior of the target user.

12. The electronic device according to claim 11, wherein the behavior of the target user comprises at least one of a motion, a posture, a gesture, and a breathing rate, and the behavior data further comprises at least one of following:
a motion data indicating the motion of the target user;
a posture data indicating the posture of the target user;
a gesture data indicating the gesture of the target user; and
a breathing rate data indicating the breathing rate of the target user.

13. A non-transitory computer-readable storage medium storing one or more programs comprising instructions that, when executed by one or more processors of a computing device, cause the computing device to perform operations comprising:
- obtaining a speech pattern data of a target user based on speech information of the target user, wherein the speech pattern data indicates a speech feature of the target user, wherein the speech feature comprises a lexical feature and a grammatical feature, wherein the speech pattern data comprises a lexical data indicating the lexical feature of the target user, and a grammatical data indicating the grammatical feature of the target user, and wherein the obtaining the speech pattern data of the target user based on the speech information of the target user comprises:
  - performing a speech recognition on the speech information of the target user to obtain a speech text;
  - obtaining a modal particle commonly used by the target user from the speech text to determine the modal particle as the lexical data; and
  - obtaining, by analyzing a grammar in the speech text, a tag representing a grammar commonly used by the target user to determine the tag as the grammatical data; and
- converting a broadcast text into an audio content for delivery to the target user based on the speech pattern data, wherein a text of the audio content corresponds to the broadcast text, and the audio content has the speech feature.

14. The computer-readable storage medium of claim 13, wherein the speech feature further comprises at least one of a pronunciation feature and a speech rate feature, and wherein the speech pattern data further comprises at least one of following:
- a pronunciation data indicating the pronunciation feature of the target user; and
- a speech rate data indicating the speech rate feature of the target user.

15. The computer-readable storage medium of claim 13, wherein the operations further comprising:
- obtaining, based on an image information of the target user, a facial expression data indicating a facial expression of the target user, wherein the image information corresponds to the speech information; and
- driving, based on the facial expression data, a digital human to deliver the audio content, wherein the digital human has a broadcast expression when delivering the audio content, and wherein the broadcast expression corresponds to the facial expression of the target user.

16. The computer-readable storage medium of claim 15, wherein the facial expression data comprises an expression type data and an expression intensity data.

17. The computer-readable storage medium of claim 15, wherein the operations further comprising:
- obtaining a behavior data of the target user based on the image information, wherein the behavior data indicates a behavior of the target user; and
- wherein the driving, based on the facial expression data, the digital human to deliver the audio content comprises:
- driving, based on the facial expression data and the behavior data, the digital human to deliver the audio content, wherein the digital human has the broadcast expression and a broadcast behavior when delivering the audio content, and wherein the broadcast behavior corresponds to the behavior of the target user.

18. The computer-readable storage medium of claim 17, wherein the behavior of the target user comprises at least one of a motion, a posture, a gesture, and a breathing rate, and the behavior data further comprises at least one of following:
- a motion data indicating the motion of the target user;
- a posture data indicating the posture of the target user;
- a gesture data indicating the gesture of the target user; and
- a breathing rate data indicating the breathing rate of the target user.

* * * * *